US008716427B2

(12) United States Patent
Imai et al.

(10) Patent No.: US 8,716,427 B2
(45) Date of Patent: May 6, 2014

(54) TWO-COMPONENT CURABLE SOLVENTLESS ADHESIVE

(75) Inventors: Akihiro Imai, Takaishi (JP); Kazuaki Imamura, Minato-ku (JP); Taiji Morimoto, Minato-ku (JP); Hiroshi Kawasaki, Osaka (JP); Mikio Matsufuji, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 778 days.

(21) Appl. No.: 11/658,403

(22) PCT Filed: Feb. 4, 2005

(86) PCT No.: PCT/JP2005/002105
§ 371 (c)(1),
(2), (4) Date: Jan. 26, 2007

(87) PCT Pub. No.: WO2006/011256
PCT Pub. Date: Feb. 2, 2006

(65) Prior Publication Data
US 2008/0308226 A1   Dec. 18, 2008

(30) Foreign Application Priority Data

Jul. 30, 2004 (JP) ................................. 2004-224545

(51) Int. Cl.
C08G 18/00 (2006.01)
C09J 4/00 (2006.01)
C09J 101/00 (2006.01)

(52) U.S. Cl.
USPC ............ 528/80; 528/59; 528/65; 528/66; 528/76; 528/85; 156/330.9; 156/331.4; 156/331.7; 156/331.8; 156/332

(58) Field of Classification Search
USPC ........ 528/44, 59, 65, 66, 76, 80, 85; 156/327, 156/330.9, 331.4, 331.7, 331.8, 332; 524/591

See application file for complete search history.

(56) References Cited

U.S. PATENT DOCUMENTS

| 5,907,012 A * | 5/1999 | Voss et al. ..................... 524/591 |
| 6,103,822 A * | 8/2000 | Housel et al. .................. 524/840 |
| 6,423,810 B1 * | 7/2002 | Huang et al. .................... 528/77 |
| 6,649,084 B2 * | 11/2003 | Morikawa et al. ........ 252/182.22 |
| 7,129,312 B1 * | 10/2006 | Krebs et al. ..................... 528/59 |
| 2001/0040008 A1 * | 11/2001 | Bauriedel et al. ............. 156/327 |
| 2002/0157789 A1 * | 10/2002 | Imai et al. .................... 156/331.7 |
| 2002/0183443 A1 * | 12/2002 | Housel et al. .................. 524/591 |
| 2003/0083428 A1 * | 5/2003 | Bauriedel et al. ............. 524/589 |
| 2003/0096110 A1 * | 5/2003 | Terada et al. ................. 428/345 |
| 2004/0014847 A1 | 1/2004 | Bolte et al. |
| 2006/0205909 A1 * | 9/2006 | O'Brien ......................... 528/44 |

FOREIGN PATENT DOCUMENTS

| JP | 03-234783 A | 10/1991 |
| JP | 04-293987 A | 10/1992 |
| JP | 6-506007 A | 7/1994 |
| JP | 07-097557 A | 4/1995 |
| JP | 7-94654 B2 | 10/1995 |
| JP | 10-36807 A | 2/1998 |
| JP | 11-050036 | 2/1999 |
| JP | 11-061083 A | 3/1999 |
| JP | 2001-294839 A | 10/2001 |
| JP | 2001-316448 | 11/2001 |
| JP | 2002-249745 | 9/2002 |
| JP | 2004-115681 A | 4/2004 |
| JP | 2004-230749 A | 8/2004 |
| JP | 2004-238403 A | 8/2004 |
| JP | 3584480 B2 | 8/2004 |

OTHER PUBLICATIONS

Office Action from Japanese Patent Office issued in related Japanese Patent Application No. 2005-026763 dated Nov. 16, 2011.
Notification of Reasons for Refusal dated Jul. 27, 2010 issued in corresponding Japanese Patent Application No. 2004-224545.

* cited by examiner

Primary Examiner — Michael L Leonard
(74) Attorney, Agent, or Firm — Buchanan Ingersoll & Rooney PC

(57) ABSTRACT

A two-component curable solventless adhesive which enables a laminated composite film comprising a barrier layer and a plastic film laminated with each other to maintain excellent appearance and adhesive strength for a long period even after a sterilization treatment at high temperature, and to appropriately adjust a reaction between a base resin and a curing agent during a production of the laminated composite film. The two-component curable solventless adhesive comprises a base resin and a curing agent, wherein the base resin contains a polyol having an acid group and a secondary or tertiary terminal hydroxyl group accounting for 30% or more of the entire terminal hydroxyl groups of the polyol, and the curing agent contains an isocyanate group-terminated urethane prepolymer containing at least an aralkyl polyisocyanate and/or a modified substance thereof as a raw polyisocyanate, and a content of a low molecular weight polyisocyanate is defined.

5 Claims, No Drawings

TWO-COMPONENT CURABLE SOLVENTLESS ADHESIVE

TECHNICAL FIELD

The present invention relates to a two-component curable solventless adhesive and, more particularly, to a two-component curable solventless adhesive which is used as an adhesive for a laminate.

BACKGROUND ART

Heretofore, a laminated composite film obtained by laminating various plastic films with a metal foil using an adhesive has been used widely in the field of packaging. Particularly, a laminated composite film comprising a metal foil is excellent in light shielding properties of the metal foil and gas and liquid barrier properties and is therefore used widely as a packaging material for foods to be subjected to a sterilization treatment at high temperature.

As the adhesive for a laminate used to laminate the laminated composite film, a two-component curable urethane adhesive comprising a base resin containing a polyesterpolyol and a curing agent containing a polyisocyanate is widely used in view of handiness and excellent adhesion performance.

The laminated composite film comprising a metal foil is usually produced in the form of a three-layered structure by laminating a drawn plastic film (PET, NY, etc.) on one surface of a metal foil using an adhesive for a laminate and laminating an undrawn plastic film (CPP, etc.) on the other surface of the metal foil using an adhesive for a laminate. Contents such as food are usually packed so as to contact with the side of the undrawn plastic film. There also may be a case of using a four-layered structure laminated composite film produced by further laminating another drawn plastic film on the inner or outer side so as to contact with the metal foil.

Use of a solvent has been restricted recently so as to improve working environment. Therefore an organic solvent-based adhesive has been replaced by a solventless adhesive in production of the laminated composite film. As the solventless adhesive, a two-component curable solventless adhesive containing a polyol as a base resin and a polyisocyanate as a curing agent is used.

However, a molecular weight of the component in the solventless adhesive is far smaller than that of the component in the solvent-based adhesive. Therefore, the solventless adhesive may cause a problem that when it is used in the production of the laminated composite film comprising a metal foil such as an aluminum foil which requires a sterilization treatment at high temperature, an adhesive strength of the side of the metal foil, which contacts with foods, drastically decreases after the sterilization treatment at high temperature.

Particularly, when foods containing an acid component such as vinegar is packed, as contents, such a phenomenon appears more remarkably. Furthermore, when the packaging material is stored for a long period, there may arise problems in presenting pear skin appearance and peeling of the plastic film from the metal foil of the laminated composite film.

Under these circumstances, the two-component curable solventless adhesive has hitherto been used restrictly in the field of dry foods and snack foods which do not require a heat treatment, and it is partly used as a packaging material comprising no metal foil in applications which require a sterilization treatment at high temperature.

Therefore, in the two-component curable solventless adhesive, a method of acid-modifying hydroxyl groups of a polyol with an acid anhydride has been proposed as means for improving adhesion between the metal foil such as an aluminum foil and a plastic film.

In Japanese Examined Patent Publication (Kokoku) No. 7-94654, for example, there is proposed an adhesive composition comprising a polyol or a polyurethanepolyol and a polyurethane polyisocyanate, which comprises a polyol having a carboxyl group obtained by reacting a polyol having three or more functional hydroxyl groups with a polycarboxylic acid so as to remain at least two hydroxyl groups, as the polyol, and a polyurethanepolyol obtained by copolymerizing a carboxyl group-containing polyol, which is obtained by reacting a polyol having three or more functional hydroxyl groups with a polycarboxylic acid so as to remain at least two hydroxyl groups, as the polyurethanepolyol.

In Japanese Patent No. 3,584,480, for example, there is proposed a solventless adhesive composition for a film-film composite laminate comprising an organic polymerpolyol compound selected from polyesterpolyol, polyetherpolyol, polyetheresterpolyol and polyurethanepolyol each having a number average molecular weight of 300 to 5000, an organic polymerpolyol compound having a carboxyl group introduced by adding a carboxylic anhydride to the organic polymerpolyol compound, and a polyisocyanate compound, wherein a content of the carboxylic anhydride is from 0.3 to 1 parts by weight based on 100 parts of a solid content of the organic polymerpolyol compound.

However, when hydroxyl groups of the polyol are acid-modified or an anhydride of carboxylic acid is added in the two-component curable solventless adhesive, workability usually deteriorates due to a rapid increase in viscosity. A decrease in the amount of hydroxyl groups to be acid-modified causes a problem such as pear skin, and thus peeling of the metal foil from the plastic film may occur.

DISCLOSURE OF THE INVENTION

An object of the present invention is to provide a two-component curable solventless adhesive which enables a laminated composite film comprising a barrier layer and a plastic film laminated with each other to maintain excellent appearance and adhesive strength for a long period even after a sterilization treatment at high temperature, and to appropriately adjust a reaction between a base resin and a curing agent during a production of the laminated composite film, thereby to ensure excellent workability.

The present invention provides a two-component curable solventless adhesive comprising a base resin and a curing agent, wherein the base resin contains a polyol having an acid group and a secondary or tertiary terminal hydroxyl group accounting for 30% or more of the entire terminal hydroxyl groups of the polyol, and the curing agent contains an isocyanate group-terminated urethane prepolymer containing at least an aralkyl polyisocyanate and/or a modified substance thereof as a raw polyisocyanate, and a content of a low molecular weight polyisocyanate having a molecular weight of 190 or less is 3% by weight or less.

In the present invention, an average functionality on a molar basis (hereinafter referred to as an average functionality) of the isocyanate group-terminated urethane prepolymer is preferably from 1.5 to 2.5.

In the present invention, it is preferable that the curing agent contains an aliphatic polyisocyanate and/or a modified substance thereof, and a content of the isocyanate group-terminated urethane prepolymer is from 1 to 80% by weight and a content of the aliphatic polyisocyanate and/or the modified substance thereof is from 20 to 99% by weight, based on a total amount of the isocyanate group-terminated urethane prepolymer and the aliphatic polyisocyanate and/or the modified substance thereof in the curing agent.

In the present invention, a value calculated from the following formula (1) is preferably 10 or more and 80 or less.

$$\frac{(\text{Acid equivalent of base resin}) \times (\text{Amount of curing agent (parts by weight)})}{(\text{Isocyanate equivalent of curing agent}) \times (\text{Amount of base resin (parts by weight)})} \quad (1)$$

In the present invention, it is preferably used so as to laminate a barrier layer and a plastic film.

The present invention provides a two-component curable solventless adhesive comprising a base resin and a curing agent, wherein the base resin contains a polyol having an acid group and a secondary or tertiary terminal hydroxyl group accounting for 30% or more of the entire terminal hydroxyl groups of a molecular of the polyol, and the curing agent contains an aralkyl polyisocyanate and/or a modified substance thereof, and a value calculated from the following formula (1) is 10 or more and 80 or less.

$$\frac{(\text{Acid equivalent of base resin}) \times (\text{Amount of curing agent (parts by weight)})}{(\text{Isocyanate equivalent of curing agent}) \times (\text{Amount of base resin (parts by weight)})} \quad (1)$$

The present invention provides a two-component curable solventless adhesive comprising a base resin and a curing agent, wherein the base resin contains a polyol having an acid group and a secondary or tertiary terminal hydroxyl group accounting for 30% or more of the entire terminal hydroxyl groups of the polyol, and the curing agent contains an isocyanate group-terminated urethane prepolymer having an average functionality group of 1.5 to 2.5 obtained by reacting an aralkyl polyisocyanate and/or a modified substance thereof with a polyol, and an aliphatic polyisocyanate and/or a modified substance thereof.

The two-component curable solventless adhesive of the present invention enables a laminated composite film comprising a barrier layer and a plastic film laminated with each other to maintain excellent appearance and adhesive strength for a long period even after a sterilization treatment at high temperature, and to appropriately adjust a reaction between the base resin and the curing agent during a production of the laminated composite film, thereby to ensure excellent workability.

BEST MODE FOR CARRYING OUT THE INVENTION

The two-component curable solventless adhesive of the present invention comprises a base resin and a curing agent. In the present invention, the base resin contains a polyol having an acid group. In the present invention, regarding the polyol having an acid group, a secondary or tertiary terminal hydroxyl group accounts for 30% (mol %, the same shall apply hereinafter) or more of the entire terminal hydroxyl groups in the polyol having an acid group. In other words, a primary terminal hydroxyl group accounts for less than 70% of the entire terminal hydroxyl groups in the polyol having an acid group. When the primary terminal hydroxyl group accounts for more than 70% of the entire terminal hydroxyl groups in the polyol having an acid group, the reaction between the hydroxyl group and the isocyanate group is activated during mixing of the base resin with the curing agent, whereby workability deteriorates due to an increase in viscosity. The secondary or tertiary terminal hydroxyl group preferably accounts for 30 to 100% of the entire terminal hydroxyl groups in the polyol having an acid group.

In the present invention, the polyol having an acid group is not specifically limited as far as it is a polyol having at least one acid group in the molecule and also the terminal hydroxyl group satisfies the above proportion, and there can be used any polyol which can be used as the base resin of the two-component curable solventless adhesive.

In the present invention, as far as at least one acid group of the polyol having an acid group is covalently bonded to the molecular chain of the polyol, the acid group may be present at the molecular end or may be present in the molecular chain. Examples of the acid group include a carboxylic acid group, sulfonic acid group, phosphoric acid group, or metal salt such as a sodium salt thereof. Among these, a carboxylic acid group is preferable.

The polyol having such an acid group can be obtained, for example, by reacting a terminal hydroxyl group of a macropolyol or a polyhydric alcohol with an acid anhydride, thereby to acid-modify the terminal hydroxyl group, or synthesizing a macropolyol using a polyhydric alcohol having an acid group in the molecule as one of raw components. By introducing the acid group, the strength of adhesion with a barrier layer can be improved and deterioration of the content resistance after the heat sterilization treatment can be prevented.

The proportion of the acid group is 0.3% (mol %, the same shall apply hereinafter) or more and less than 20%, preferably 0.4% or more, and more preferably 0.5% or more and less than 15%, based on the total amount of the entire terminal hydroxyl groups and acid groups in the polyol having an acid group. When the proportion of the acid group is 0.3% or more, an adhesion with the barrier layer can be more increased. On the other hand, when the proportion of the acid group is less than 20%, an increase in viscosity can be suppressed during mixing of the base resin with the curing agent, whereby excellent workability can be obtained.

In the present invention, regarding the polyol having an acid group, the terminal hydroxyl group of the polyol is preferably acid-modified with an acid anhydride. By modification with the acid anhydride, adhesive strength can be improved and deterioration of the content resistance after the heat sterilization treatment can be prevented.

The acid anhydride used for modification is not specifically limited and examples thereof include trimellitic anhydride, phthalic anhydride, maleic anhydride and pyromellitic anhydride. Among these, trimellitic anhydride is preferable.

The acid modification rate due to the acid anhydride is based on the proportion of the acid group. More specifically, the proportion of the acid anhydride is 0.3 parts by weight or more and less than 10 parts by weight, preferably 0.4 parts by weight or more and less than 5 parts by weight, and more preferably 0.5 parts by weight or more and less than 5 parts by weight, based on 100 parts by weight of the polyol to be modified with an acid. When the proportion of the acid anhydride used for acid modification is 0.3 parts by weight or more, the adhesion with the barrier layer can be more increased. On the other hand, when the proportion of the acid anhydride used for acid modification is less than 10 parts by weight, the increase in viscosity can be suppressed during mixing of the base resin with the curing agent, whereby excellent workability can be obtained.

To modify the terminal hydroxyl group with the acid anhydride, for example, the terminal hydroxyl group of the polyol may be reacted with the acid anhydride in the proportion within the above range at 100 to 200° C.

When the polyol having an acid group thus obtained is used as the base resin, the reaction after mixing the base resin with the curing agent can be appropriately controlled, whereby excellent workability can be obtained.

Examples of the polyol to be acid-modified include macropolyols such as polyesterpolyol, polyetherpolyol or polyurethanepolyol, and polyhydric alcohol. These polyols may be used alone or in combination.

The polyesterpolyol can be obtained by a known esterification reaction, for example, a condensation reaction between a polybasic acid and a polyhydric alcohol, or an ester exchange reaction between an alkyl ester of a polybasic acid and a polyhydric alcohol.

Examples of the polybasic acid or the alkyl ester thereof include aliphatic dicarboxylic acids such as succinic acid, adipic acid, azelaic acid, sebacic acid, dodecanedioic acid or dimer acid; alicyclic dicarboxylic acids such as hexahydrophthalic acid or tetrahydrophthalic acid; aromatic dicarboxylic acids such as phthalic acid, isophthalic acid, terephthalic acid or naphthalenedicarboxylic acid; or a dialkyl ester thereof (for example, $C_1$-$C_6$ alkyl ester, etc.) or an acid anhydride thereof such as phthalic anhydride, or a mixture thereof.

Examples of the polyhydric alcohol include alkanediols (for example, $C_2$-$C_{40}$ alkane or aliphatic low-molecular diols such as ethylene glycol, propylene glycol, 1,4-butanediol, 1,3-butanediol, 2-methyl-1,3-propanediol, 1,5-pentanediol, 3-methyl-1,5-pentanediol, 2,4-diethyl-1,5-pentanediol, 1,6-hexanediol, neopentyl glycol, 3,3'-dimethylolheptane, 1,9-nonanediol, 1,10-decanediol, 12-hydroxystearyl alcohol or hydrogenated dimerdiol), polyoxyalkylene glycol (for example, poly(oxy $C_2$-$C_4$ alkylene) glycols such as diethylene glycol, triethylene glycol, polyoxyethylene glycol, dipropylene glycol, polyoxypropylene glycol or polyoxytetramethylene glycol, or copolymers of $C_2$-$C_4$ alkylene oxide), alkylene oxide adducts of bisphenol A or hydrogenated bisphenol A, three or more functional polyol (for example, glycerin, trimethylolpropane, pentaerythritol or sorbitol), or a mixture thereof.

To obtain the polyesterpolyol in which the secondary or tertiary terminal hydroxyl group accounts for 30% or more of the entire terminal hydroxyl groups, for example, a polyhydric alcohol having terminal hydroxyl groups, at least one of which is a secondary or tertiary terminal hydroxyl group, preferably a glycol having terminal hydroxyl groups, at least either of which is a secondary or tertiary terminal hydroxyl group, more specifically propylene glycol or 1,3-butanediol is mixed in an appropriate proportion.

Consequently, the primary hydroxyl group with a higher reaction rate preferentially reacts with a polybasic acid or an alkyl ester thereof, while the secondary hydroxyl group with a lower reaction rate is likely to be remained, and thus the secondary or tertiary terminal hydroxyl group is preferentially remained as compared with the primary terminal hydroxyl group. Therefore, by mixing a polyhydric alcohol, at least one of which is a secondary or tertiary terminal hydroxyl group in an appropriate proportion, it is possible to easily obtain a polyesterpolyol in which a secondary or tertiary terminal hydroxyl group accounts for 30% or more of the entire terminal hydroxyl groups.

The polyetherpolyol can be obtained by ring-opening homopolymerization or ring-opening copolymerization of an alkylene oxide (for example, $C_2$-$C_5$ alkylene oxides such as ethylene oxide, propylene oxide, butylene oxide, tetrahydrofuran, 3-methyltetrahydrofuran, and oxetane compounds). In this case, in order to obtain a polyetherpolyol in which a secondary or tertiary terminal hydroxyl group accounts for 30% or more of the entire terminal hydroxyl groups, a homopolymerization of an alkylene oxide which produces a secondary or tertiary terminal hydroxyl group serving as at least one terminal hydroxyl group in the ring-opening, more specifically a homopolymerization of propylene oxide is performed. If necessary, an alkylene oxide which produces primary terminal hydroxyl groups corresponding to entire terminal hydroxyl groups in the ring-opening such as ethylene oxide can be reacted with the alkylene oxide which produces the secondary or tertiary terminal hydroxyl group in an appropriate proportion. It is possible to easily obtain a polyesterpolyol in which a secondary or tertiary terminal hydroxyl group accounts for 30% or more of the entire terminal hydroxyl groups.

The polyurethanepolyol can be obtained as a polyester polyurethanepolyol, a polyether polyurethanepolyol or a polyester polyether polyurethanepolyol by reacting the polyesterpolyol and/or polyetherpolyol thus obtained with a polyisocyanate described hereinafter. In this case, in order to obtain a polyurethanepolyol in which a secondary or tertiary terminal hydroxyl group accounts for 30% or more of the entire terminal hydroxyl groups, the polyesterpolyol and/or polyetherpolyol in which the proportion of the secondary or tertiary terminal hydroxyl group to the entire terminal hydroxyl groups is adjusted may be reacted with the polyisocyanate in the same manner. As the reaction between the polyesterpolyol and/or polyetherpolyol and the polyisocyanate, a known urethanization reaction can be employed.

The number average molecular weight of the macropolyols such as polyesterpolyol, polyetherpolyol or polyurethanepolyol is preferably from 400 to 5000.

The polyhydric alcohol used as the polyol which is acid-modified includes, for example, the same polyhydric alcohol as that used as the raw component of the polyesterpolyol. The polyhydric alcohol is used in a proportion of 0.01% by weight or more and 50% by weight or less in the base resin.

The hydroxyl group equivalent of the base resin containing a polyol having an acid group is from 150 to 1000, preferably from 170 to 700, and more preferably from 170 to 500, and the acid equivalent thereof is from 1000 to 28000, preferably from 1500 to 22500, and more preferably from 2000 to 15000.

In the present invention, the curing agent contains an isocyanate group-terminated urethane prepolymer which contains an aralkyl polyisocyanate and/or a modified substance thereof as a raw polyisocyanate.

Such an isocyanate group-terminated urethane prepolymer is obtained, for example, by reacting a raw polyisocyanate containing at least an aralkyl polyisocyanate and/or a modified substance thereof with a polyol.

Examples of the aralkyl polyisocyanate include 1,3- or 1,4-xylylene diisocyanate or a mixture thereof (XDI), 1,3- or 1,4-tetramethylxylylene diisocyanate or a mixture thereof (TMXDI), and ω,ω'-diisocyanate-1,4-diethylbenzene.

Examples of the modified substance of the aralkyl polyisocyanate include a multimer (for example, dimer, trimer, etc.) of an aralkyl polyisocyanate, a biuret modified substance produced by reacting an aralkyl polyisocyanate or a multimer with water, an allophanate modified substance produced by reacting with a polyhydric alcohol, and an oxadiazinetrione modified substance produced by reacting with a carbonic acid gas.

These aralkyl polyisocyanates and/or a modified substances may be used alone or in combination. 1,3- or 1,4-xylylene diisocyanate or a mixture thereof (XDI) is preferable.

As the raw polyisocyanate, a polyisocyanate described hereinafter (for example, at least one polyisocyanate selected from aliphatic polyisocyanates, alicyclic polyisocyanates and aromatic polyisocyanates, preferably aliphatic polydiisocyanates or alicyclic polyisocyanates, and more preferably aliphatic polyisocyanates) other than the aralkyl polyisocyanate and/or the modified substance thereof can also been used in combination with the aralkyl polyisocyanate and/or the modified substance thereof.

Examples of the polyol include the macropolyols and polyhydric alcohol described above. These polyols may be used alone or in combination.

In order to obtain the isocyanate group-terminated urethane prepolymer, first, an urethanization reaction of a raw polyisocyanate containing at least an aralkyl polyisocyanate and/or a modified substance thereof, and a polyol is conducted so that an equivalent ratio of an isocyanate group of the raw polyisocyanate to a hydroxyl group of the polyol, (NCO/OH), is more than 1, and preferably from 2 to 100. The urethanization reaction is conducted under the conditions of a known urethanization reaction. Then, the unreacted raw polyisocyanate is removed. The method of removing the unreacted raw polyisocyanate is not specifically limited and, for example, known methods such as a thin film distillation method and a solvent extraction method are employed.

The other method of obtaining the isocyanate group-terminated prepolymer includes a method which does not require a removal of the unreacted raw polyisocyanate. This method is a method comprising the steps of previously reacting a raw polyisocyanate with a polyol, after removing the unreacted raw polyisocyanate to prepare a modified polyisocyanate having a limited functionality, and then reacting the modified polyisocyanate with the polyol.

When a reactivity of the raw polyisocyanate with the polyol is higher than that of the modified polyisocyanate with the polyol, the raw polyisocyanate and the modified polyisocyanate may be simultaneously reacted with the polyol. Consequently, it is possible to obtain an isocyanate group-terminated prepolymer in which the content of the unreacted raw polyisocyanate is limited. In this method, the raw polyisocyanate is preferably a raw polyisocyanate containing at least an aralkyl polyisocyanate, and more preferably an aralkyl polyisocyanate is used alone. The modified polyisocyanate is preferably a modified aliphatic and/or alicyclic polyisocyanate, and more preferably a modified aliphatic polyisocyanate.

Consequently, it is possible to obtain an isocyanate group-terminated urethane prepolymer in which an average functionality is preferably from 1.5 to 2.5, and more preferably from 1.7 to 2.4. The content of the unreacted raw polyisocyanate in the resulting isocyanate group-terminated urethane prepolymer is 5% by weight or less, and preferably 4% by weight or less. When the curing agent contains such an isocyanate group-terminated urethane prepolymer, high peel strength is exhibited even after the heat sterilization treatment and heat resistance of the laminated composite film can be improved.

In the present invention, the curing agent preferably contains an aliphatic polyisocyanate and/or a modified substance thereof.

Examples of the aliphatic polyisocyanate include hexamethylene diisocyanate (HDI), trimethylene diisocyanate, tetramethylene diisocyanate, pentamethylene diisocyanate, 1,2-, 2,3- or 1,3-butylene diisocyanate, and 2,4,4- or 2,2,4-trimethylhexamethylene diisocyanate. These aliphatic polyisocyanates may be used alone or in combination. Among these, hexamethylene diisocyanate (HDI) is preferable.

Examples of the modified aliphatic polyisocyanate include a multimer (for example, dimer, trimer, etc.) of an aliphatic polyisocyanate, a biuret modified substance produced by reacting an aliphatic polyisocyanate or the multimer with water, an allophanate modified substance produced by reacting with a polyhydric alcohol, and a oxadiazinetrione modified substance produced by reacting with a carbonic acid gas. Such a modified substance includes a polyol modified substance produced by reacting the aliphatic polyisocyanate with the polyol. The modified aliphatic polyisocyanate is preferably a multimer of an aliphatic polyisocyanate, and more preferably a trimer of an aliphatic polyisocyanate.

The trimer of the aliphatic polyisocyanate may be obtained by adding a known trimerized catalyst thereby to trimerize the aliphatic polyisocyanate, or may be obtained by reacting a portion of isocyanate groups in the aliphatic polyisocyanate with a monoalcohol ($C_1$-$C_{10}$ alcohol, preferably $C_3$-$C_6$ alcohol) or the above polyhydric alcohol ($C_1$-$C_{10}$ diol, preferably $C_3$-$C_6$ diol), followed by trimerization.

Regarding the weight proportion of the isocyanate group-terminated urethane prepolymer and that of the aliphatic polyisocyanate and/or the modified substance thereof in the curing agent, the content of the isocyanate group-terminated urethane prepolymer is from 1 to 80% by weight, preferably from 10 to 75% by weight, and more preferably from 30 to 70% by weight, based on the total amount thereof, while the content of the aliphatic polyisocyanate and/or the modified substance thereof is from 99 to 20% by weight, preferably from 90 to 25% by weight, and more preferably from 70 to 30% by weight, based on the total amount thereof.

When the curing agent contains the isocyanate group-terminated urethane prepolymer, and the aliphatic polyisocyanate and/or the modified substance thereof in these proportions, content resistance after the heat sterilization treatment can be improved and also proper pot life during mixing of the base resin with the curing agent can be obtained, in corporation with the reactivity of the above polyol having an acid group, and thus excellent workability can be ensured.

In the present invention, the curing agent may contain, in addition to the above aralkyl polyisocyanate and/or the modified substance thereof, a polyisocyanate and/or a modified substance thereof such as an alicyclic polyisocyanate or an aromatic polyisocyanate.

Examples of the alicyclic polyisocyanate include 3-isocyanatomethyl-3,5,5-trimethylcyclohexyl isocyanate (isophorone diisocyanate, IPDI), 4,4'-, 2,4'- or 2,2'-dicyclohexylmethane diisocyanate or a mixture thereof (hydrogenated MDI), 1,3- or 1,4-bis(isocyanatemethyl)cyclohexane or a mixture thereof (hydrogenated XDI), 1,3-cyclopentene diisocyanate, 1,4-cyclohexane diisocyanate, 1,3-cyclohexane diisocyanate, methyl-2,4-cyclohexane diisocyanate and methyl-2,6-cyclohexane diisocyanate.

Examples of the aromatic polyisocyanate include 4,4'-, 2,4'- or 2,2'-diphenylmethane diisocyanate or a mixture thereof (MDI), 2,4- or 2,6-tolylene diisocyanate or a mixture thereof (TDI), 4,4'-toluidine diisocyanate (TODI), 1,5-naphthalene diisocyanate (NDI), m- or p-phenylene diisocyanate or a mixture thereof, 4,4'-diphenyl diisocyanate and 4,4'-diphenyl ether diisocyanate.

Examples of the modified substance include a multimer (for example, dimer, trimer, etc.) of an alicyclic polyisocyanate or an aromatic polyisocyanate, a biuret modified substance produced by reacting an alicyclic polyisocyanate or an aromatic polyisocyanate or a multimer thereof with water, an allophanate modified substance produced by reacting with a polyhydric alcohol, and a oxadiazinetrione modified substance produced by reacting with a carbonic acid gas. Such a modified substance includes a polyol modified substance produced by reacting the alicyclic polyisocyanate or aromatic polyisocyanate with the polyol.

In the present invention, the curing agent can be obtained by appropriately mixing an isocyanate group-terminated urethane prepolymer containing at least an aralkyl polyisocyanate and/or a modified substance thereof as a raw polyisocyanate and various polyisocyanates and/or modified substances thereof described above according to the purposes and applications.

Although the content of the low molecular weight polyisocyanate having a molecular weight of 190 or less in the curing agent thus obtained may be reduced to substantially zero according to distillation or reaction, the content is preferably 0.01% by weight or more and 3% by weight or less, preferably 2.5% by weight or less, and more preferably 2.2% by weight or less. The low molecular weight polyisocyanate includes a polyisocyanate having a molecular weight of 190 or less among the above polyisocyanates (for example, unmodified polyisocyanate monomers in the above aralkyl polyisocyanate, aliphatic polyisocyanate, alicyclic polyisocyanate and aromatic polyisocyanate). In order to adjust the content of the low molecular weight polyisocyanate to 3% by weight or less, the content of the unreacted raw polyisocyanate in the isocyanate group-terminated urethane prepolymer may be adjusted during a removal of the unreacted raw polyisocyanate. In the case of mixing a modified substance of a polyisocyanate (the above polyisocyanate monomer), the content of the unmodified polyisocyanate may be adjusted during a modification of the polyisocyanate and also a mixing ratio of the isocyanate group-terminated urethane prepolymer to various polyisocyanates and/or modified substances thereof to be mixed may be adjusted.

The curing agent thus obtained has an isocyanate equivalent (also referred to as an amine equivalent, sometimes) within a range from 100 to 1500, and preferably from 120 to 1000.

If necessary, either or both of the base resin and the curing agent may contain a silane coupling agent, oxygen acid of phosphorus, or a derivative thereof.

The silane coupling agent may be any one which is represented by the structural formula R—Si≡(X)₃ or R—Si≡(R')(X)₂ (wherein R represents an organic group having a vinyl group, an epoxy group, an amino group, an imino group, an isocyanate group or a mercapto group, R' represents a lower alkyl group, and X represents a methoxy group, an ethoxy group or a chlorine atom) and examples thereof include a chlorosilane such as vinyltrichlorosilane; an aminosilane such as N-β-(aminoethyl)-γ-aminopropyltrimethoxysilane, γ-aminopropyltriethoxysilane, N-β-(aminoethyl)-γ-propylmethyldimethoxysilane, n-(dimethoxymethylsilylpropyl)ethylenediamine, n-(triethoxysilylpropyl)ethylenediamine or N-phenyl-γ-aminopropyltrimethoxysilane; an epoxysilane such as γ-glycidoxypropyltrimethoxysilane, γ-glycidoxypropyltriethoxysilane, β-(3,4-epoxycyclohexyl)ethyltrimethoxysilane or di(γ-glycidoxypropyl)dimethoxysilane; a vinylsilane such as vinyltriethoxysilane; and an isocyanatesilane such as 3-isocyanatepropyltrimethoxysilane and 3-isocyanatepropyltriethoxysilane. These silane coupling agents may be used alone or in combination.

The amount of the silane coupling agent is from 0.001 to 5 parts by weight, and preferably from 0.01 to 4 parts by weight, based on 100 parts by weight of the base resin or curing agent.

In the oxygen acid of phosphorus or the derivative thereof, examples of the oxygen acid of phosphorus include phosphoric acids such as hypophosphorous acid, phosphorous acid, orthophosphoric acid and hypophosphoric acid; and condensed phosphoric acids such as metaphosphoric acid, pyrophosphoric acid, tripolyphosphoric acid, polyphosphoric acid and ultraphosphoric acid.

Examples of the derivative of the oxygen acid of phosphorus include phosphates or condensed phosphates of sodium and potassium; monoesters such as monomethyl orthophosphate, monoethyl orthophosphate, monopropyl orthophosphate, monobutyl orthophosphate, mono-2-ethylhexyl orthophosphate, monophenyl orthophosphate, monomethyl phosphite, monoethyl phosphite, monopropyl phosphite, monobutyl phosphite, mono-2-ethylhexyl phosphite and monophenyl phosphate; di- and triesters, such as di-2-ethylhexyl orthophosphate, diphenyl orthophosphate, trimethyl orthophosphate, triethyl orthophosphate, tripropyl orthophosphate, tributyl orthophosphate, tri-2-ethylhexyl orthophosphate, triphenyl orthophosphate, dimethyl phosphite, diethyl phosphite, dipropyl phosphite, dibutyl phosphite, di-2-ethylhexyl phosphite, diphenyl phosphite, trimethyl phosphite, triethyl phosphite, tripropyl phosphite, tributyl phosphite, tri-2-ethylhexyl phosphate and triphenyl phosphite; and mono-, di- and triesters obtained from a condensed phosphoric acid and alcohols.

These oxygen acids of phosphorus or the derivative thereof may be used alone or in combination. Among these, those having at least one free oxygen acid are preferable and, for example, the orthophosphoric acid and the polyphosphoric acid are preferable.

The amount of the oxygen acid of phosphorus or the derivative thereof is from 0.001 to 3 parts by weight, and preferably from 0.01 to 2.5 parts by weight, based on 100 parts by weight of the base resin or curing agent.

If necessary, either or both of the base resin and curing agent may contain additives, for example, epoxy resins, catalysts, coatability improvers, leveling agents, defoamers, stabilizers such as antioxidants and ultraviolet absorbers, plasticizers, surfactants, pigments, fillers, organics or inorganic fine particles and mildewproofing agents. The amount of these additives is appropriately decided according to the purposes and applications.

In the two-component curable solventless adhesive of the present invention, the base resin and curing agent thus prepared are used so that the value calculated from the following formula (1) is 10 or more and 80 or less, and preferably 10 or more and 70 or less.

When more acid resistance is required to the laminated composite film produced by using the two-component curable solventless adhesive of the present invention, the base resin and curing agent are used so that the value calculated from the following formula (1) is 10 or more and 40 or less, and preferably 10 or more and 30 or less.

$$\frac{\text{(Acid equivalent of base resin)} \times \text{(Amount of curing agent (parts by weight))}}{\text{(Isocyanate equivalent of curing agent)} \times \text{(Amount of base resin (parts by weight))}} \quad (1)$$

When this value is less than 10, the amount of the acid component increases and workability deteriorates due to an increase in viscosity during mixing of the base resin with the curing agent, and also an amine equivalent increases and thus physical properties after curing become insufficient. When this value is more than 80, the amount of the acid component decreases to decrease adhesion with the barrier layer, whereby the amine equivalent decreases and thus reaction time increases. Furthermore, adhesive strength decreases because of too much hardening after curing.

The mixing ratio of the base resin to the curing agent is under the above conditions. More specifically, the equivalent ratio of an isocyanate group in the curing agent to an active hydrogen group (hydroxyl group and amino group) in the base resin, (NCO/OH), is preferably from 0.5 to 5, and more preferably from 0.6 to 3.

The two-component curable solventless adhesive of the present invention is coated on an adherend after mixing the base resin with the curing agent.

In the two-component curable solventless adhesive of the present invention, according to the preparation described above, the viscosity after uniform mixing of the curing agent with the base resin for 2 minutes is from 100 to 2000 mPa·s at 70° C. or 50° C., and preferably from 200 to 1800 mPa·s at 70° C. or 50° C., and the viscosity after uniform mixing of the curing agent with the base resin for 40 minutes is 20000 mPa·s or less at 70° C. or 50° C., and preferably 15000 mPa·s or less at 70° C. or 50° C. When the viscosity is within the above range, after mixing the base resin with the curing agent, the mixture can be efficiently coated on a barrier layer or a plastic film using a solventless laminator.

Regarding the viscosity of the two-component curable solventless adhesive of the present invention, it is preferable to relatively increase the amount of the acid group when a higher level acid resistance is required to the two-component curable solventless adhesive. Consequently, since the reactivity of the hydroxyl group of the base resin with the isocyanate group of the curing agent becomes higher, the viscosity is preferably within the above range at 50° C. When excellent acid resistance is not required to the two-component curable solventless adhesive, the amount of the acid group may be relatively small and the degree of activation of the reactivity of the hydroxyl group of the base resin with the isocyanate group of the curing agent relatively becomes lower. Consequently, the viscosity may be within the above range at 70° C. Regarding the specific amount of the acid group, when the acid equivalent is from 4000 to 28000, the viscosity may be within the above range at 70° C. When the acid equivalent is from 1000 to 28000, the viscosity may be within the above range at 50° C.

Therefore, the two-component curable solventless adhesive of the present invention is preferably used as an adhesive for a laminate, for lamination of a barrier layer (for example, metal foil) with a plastic film as adherends, particularly lamination of the inside layer of the barrier layer (the side filled with contents such as foods) with the plastic film.

The barrier layer is a layer having gas and liquid barrier properties and includes, for example, a layer comprising a layer made of metal or metal oxide. Examples of the barrier layer include a metal foil and a plastic film comprising a barrier layer. Examples of the metal foil include foils made of aluminum, stainless steel, iron, copper and lead. The thickness of these metal foils is from 5 to 100 μm, preferably from 5 to 20 μm, and more preferably from 5 to 15 μm.

The plastic film comprising the barrier layer includes, for example, a film in which an inorganic layer is formed on at least one surface of a plastic film. This inorganic layer can be formed by a deposition method, a sputtering method or a sol-gel method. Examples of the inorganic substance which forms the inorganic layer include single elements such as titanium, aluminum and silicon, or inorganic compounds (for example, oxide, etc.) containing these elements. Among these, a film is preferably obtained by deposition of alumina and silica alone or combination thereof.

The plastic film comprising the barrier layer may be subjected to a primer treatment with an anchor coat agent during formation of the deposition layer, and may also comprise an over coat layer at the air side of the deposition layer.

Examples of the plastic film include films made of an olefinic polymer (for example, polyethylene, polypropylene, etc.), a polyester-based polymer (for example, polyalkylene terephthalate such as polyethylene terephthalate or polybutylene terephthalate, polyalkylene naphthalate, copolyester containing a polyalkylene allylate unit thereof as a main component, etc.), a polyamide-based polymer (for example, nylon 6, nylon 66, etc.) and a vinyl-based polymer (for example, polyvinyl chloride, ethylene-vinyl acetate copolymer, ethylene-vinyl alcohol copolymer, etc.).

The plastic film and the plastic film comprising the barrier layer may be an undrawn film (for example, undrawn polyethylene, polypropylene, etc.) or may be a monoaxially or biaxially drawn film (for example, biaxially drawn polypropylene, polyalkylene terephthalate, nylon, etc.).

As the plastic film, there may be used a laminated composite film obtained by previously laminating various coextruded films and the above plastic film using the adhesive of the present invention or an other adhesive. The thickness of the plastic film is usually from 5 to 200 μm.

If necessary, the plastic film to be bonded to the barrier layer using the adhesive of the present invention may comprise other barrier layer.

The surface of the plastic film and the barrier layer may be subjected to a surface treatment such as a corona discharge treatment, or may be subjected to a primer treatment with an anchor coat agent or the like. The plastic film and the barrier layer may be appropriately subjected to printing.

The laminate may be produced by coating a mixture of a curing agent and a base resin on the surface of a barrier layer or a plastic film using a solventless laminator and laminating the adhesive surface of the barrier layer or the plastic film, followed by curing with aging at normal temperature or raised temperature.

More specifically, a plastic composite film comprising a barrier layer may be produced by laminating one surface of a barrier layer with a plastic film (primary lamination) first, or by secondary-laminating an other plastic film on at least one surface of the primary laminate after the primary lamination.

Usually, a composite film is produced by a primary lamination and, after optional aging, the composite film is wound up by a wind-up roll. After optional aging, the composite film is fed from the wind-up roll, subjected to a secondary lamination, wound up by the wind-up roll and then optionally aged.

In the primary lamination, the barrier layer and the plastic film are usually laminated. Before the secondary lamination, this composite film may be aged with heating (for example, aging at 25 to 60° C.) so as to conduct a curing reaction of the adhesive, or may be subjected to the secondary lamination immediately without aging.

Lamination (coating) is usually carried out at a temperature of 35° C. or higher, and preferably 40° C. or higher. The upper limit of the temperature does not exist as far as lamination can be carried out, and the temperature is usually 100° C. or lower, preferably 90° C. or lower, and more preferably 85° C. or lower. During the lamination (coating), the viscosity of the adhesive is preferably adjusted to a proper viscosity by heating to a temperature within a range from 35 to 100° C., preferably from 35 to 90° C., and more preferably from 40 to 80° C. The proper viscosity is from 100 to 5000 mPa·s, and preferably from 300 to 3000 mPa·s at a predetermined temperature within the above range. By heating at a temperature of 100° C. or lower, the reaction between the base resin and the curing agent before coating can be suppressed and excess thickening can be prevented, and also excellent workability can be ensured.

The coating amount of the two-component curable solventless adhesive of the present invention is from 0.5 to 5 g/m², preferably from 1 to 5 g/m², and more preferably from 1.5 to 4.5 g/m² in each lamination step. When the coating amount is less than 0.5 g/m², the adhesion is not sufficiently exhibited and the appearance may deteriorate. On the other hand, when the coating amount is more than 5 g/m², the adhesive leaks out from the end portion of the film, whereby the quality of the laminated composite film may deteriorate.

In the lamination, the two-component curable solventless adhesive of the present invention may be used to laminate a barrier layer with a plastic film (lamination of the surface at the side of a barrier layer side with a plastic film when the barrier layer is a plastic film comprising the barrier layer) at the inside layer of the barrier layer (the side to contact with contents such as foods). In the other step, not only the adhesive of the present invention, but also other solventless adhesive or a solvent-based adhesive can be appropriately used.

The laminated composite film produced by using the two-component curable solventless adhesive of the present invention maintains excellent appearance and adhesive strength for a long period even after a hot water spray type, a hot water rotary type or a steam type sterilization treatment at high temperature in which a treatment with hot water at 100° C. or higher is conducted, reduces occurrence of peeling between the respective layers, and is excellent in interlaminar adhesion, moist heat resistance and high-temperature sterilization suitability without causing deterioration of contents, and thus the laminated composite film can be preferably used to produce packaging materials in various industrial fields of foods, beverages, drugs and quasi drugs.

According to the two-component curable solventless adhesive of the present invention, the reaction between the base resin and the curing agent is appropriately adjusted during the production of the laminated composite film, thereby to suppress a rapid increase in viscosity, and thus excellent workability can be ensured.

EXAMPLES

The present invention will now be described in more detail by way of examples, but the present invention is not limited thereto.

Preparation Example 1

Preparation of Polyesterpolyol A 684.00 g of isophthalic acid, 602.21 g of 1,3-butanediol, 181.26 g of 1,6-hexanediol and 162.91 g of neopentyl glycol were charged in a reactor and an esterification reaction was performed under a nitrogen gas stream at 190 to 220° C. After a predetermined amount of water was distilled off, 200.57 g of adipic acid, 277.57 g of sebacic acid and 0.18 g of stannous octoate (Stanoct) were added and an esterification reaction was performed under a nitrogen gas stream at 180 to 220° C. to obtain a polyesterpolyol A.

Preparation Example 2

Preparation of Terminal Acid-Modified Polyesterpolyol B 1000 g of the polyesterpolyol A was acid-modified at 110° C. by adding 1 g of trimellitic anhydride to obtain a polyesterpolyol B.

In the resulting polyesterpolyol B, a proportion of an acid group (the proportion modified with an acid anhydride among the entire terminal hydroxyl groups) was 0.2% and a secondary or tertiary terminal hydroxyl group accounted for 95% of the entire terminal hydroxyl groups.

Preparation Example 3

Preparation of Terminal Acid-Modified Polyesterpolyol C 702.91 g of isophthalic acid, 585.00 g of 1,3-butanediol, 176.09 g of 1,6-hexanediol and 158.26 g of neopentyl glycol were charged in a reactor and an esterification reaction was performed under a nitrogen gas stream at 190 to 220° C. After a predetermined amount of water was distilled off, 206.11 g of adipic acid, 285.24 g of sebacic acid and 0.18 g of stannous octoate were added and an esterification reaction was performed under a nitrogen gas stream at 180 to 220° C., followed by cooling to 110° C. The reaction product was acid-modified at 110° C. by adding 12.60 g of trimellitic anhydride to obtain a polyesterpolyol C.

In the resulting polyesterpolyol C, a proportion of an acid group (the proportion modified with an acid anhydride among the entire terminal hydroxyl groups) was 1.8% and a secondary or tertiary terminal hydroxyl group accounted for 95% of the entire terminal hydroxyl groups.

Preparation Example 4

Preparation of Polyesterpolyol D 898.90 g of isophthalic acid, 294.11 g of ethylene glycol, 418.91 g of 1,6-hexanediol and 284.43 g of neopentyl glycol were charged in a reactor and an esterification reaction was performed under a nitrogen gas stream at 190 to 220° C. After a predetermined amount of water was distilled off, 263.58 g of adipic acid and 0.19 g of stannous octoate were added and an esterification reaction was performed under a nitrogen gas stream at 180 to 220° C. to obtain a polyesterpolyol D.

Preparation Example 5

Preparation of Terminal Acid-Modified Polyesterpolyol E 482.35 g of isophthalic acid, 241.17 g of terephthalic acid, 637.00 g of 2-methyl-1,3-propanediol, 191.74 g of 1,6-hexanediol and 172.33 g of neopentyl glycol were charged in a reactor and an esterification reaction was performed under a nitrogen gas stream at 190 to 220° C. After a predetermined amount of water was distilled off, 212.16 g of adipic acid, 293.61 g of sebacic acid and 0.19 g of stannous octoate were added and an esterification reaction was performed under a nitrogen gas stream at 180 to 220° C., followed by cooling to 110° C. The reaction product was acid-modified at 110° C. by adding 13.33 g of trimellitic anhydride to obtain a polyesterpolyol E.

In the resulting polyesterpolyol E, a proportion of an acid group (the proportion modified with an acid anhydride among the entire terminal hydroxyl groups) was 1.5% and a secondary or tertiary terminal hydroxyl group accounted for 0% of the entire terminal hydroxyl groups.

Preparation Example 6

Preparation of Polyesterpolyol F 242.25 g of dimethyl terephthalate, 621.77 g of isophthalic acid, 384.89 g of ethylene glycol, 104.53 g of neopentyl glycol, 355.84 g of 1,6-hexanediol and 0.17 g of zinc acetate were charged in a reactor and an esterification reaction was performed under a nitrogen gas stream at 180 to 220° C. After a predetermined amount of water and methanol were distilled off, 234.82 g of azelaic acid was added and an esterification reaction was performed under a nitrogen gas stream at 180 to 220° C. to obtain a polyesterpolyol F.

Preparation Example 7

Preparation of Polyesterpolyol G 1554.74 g of isophthalic acid and 2807.16 g of 1,3-butanediol were charged in a reactor and an esterification reaction was performed under a nitrogen gas stream at 190 to 220° C. After a predetermined amount of water was distilled off, 1367.66 g of adipic acid and 0.48 g of stannous octoate were added and an esterification reaction was performed under a nitrogen gas stream at 180 to 220° C. to obtain a polyesterpolyol G.

Preparation Example 8

Preparation of Terminal Acid-Modified Polyesterpolyol H 1525.01 g of isophthalic acid, 1400.71 g of 1,3-butanediol and 1515.72 g of neopentyl glycol were charged in a reactor and an esterification reaction was performed under a nitrogen gas stream at 190 to 220° C. After a predetermined amount of water was distilled off, 1341.51 g of adipic acid and 0.49 g of stannous octoate were added and an esterification reaction was performed under a nitrogen gas stream at 180 to 220° C., followed by cooling to 110° C. The reaction product was acid-modified at 110° C. by adding 34.65 g of trimellitic anhydride to obtain a polyesterpolyol H.

In the resulting polyesterpolyol H, a proportion of an acid group (the proportion modified with an acid anhydride among the entire terminal hydroxyl groups) was 0.9% and a secondary or tertiary terminal hydroxyl group accounted for 33.3% of the entire terminal hydroxyl groups.

Preparation Example 9

Preparation of Polyesterpolyol I 1534.89 g of isophthalic acid, 1868.86 g of 1,3-butanediol and 1011.15 g of neopentyl glycol were charged in a reactor and an esterification reaction was performed under a nitrogen gas stream at 190 to 220° C. After a predetermined amount of water was distilled off, 1350.2 g of adipic acid and 0.49 g of stannous octoate were added and a reaction was performed under a nitrogen gas stream at 180 to 220° C. to obtain a polyesterpolyol I.

Preparation Example 10

Preparation of Terminal Acid-Modified Polyesterpolyol J 1000 g of the polyesterpolyol I was acid-modified at 110° C. by adding 7 g of trimellitic anhydride to obtain a polyesterpolyol J.

In the resulting polyesterpolyol J, a proportion of an acid group (the proportion modified with an acid anhydride among the entire terminal hydroxyl groups) was 0.9% and a secondary or tertiary terminal hydroxyl group accounted for 41.7% of the entire terminal hydroxyl groups.

Preparation Example 11

Preparation of Polyesterpolyol K 2866.98 g of isophthalic acid, 3569.77 g of 1,3-butanediol and 1931.43 g of neopentyl glycol were charged in a reactor and an esterification reaction was performed under a nitrogen gas stream at 190 to 220° C. After a predetermined amount of water was distilled off, 1261.01 g of adipic acid, 1745.14 g of sebacic acid and 0.98 g of stannous octoate were added and a reaction was performed under a nitrogen gas stream at 180 to 220° C. to obtain a polyesterpolyol K.

Preparation Example 12

Preparation of Terminal Acid-Modified Polyesterpolyol L 1000 g of the polyesterpolyol K was acid-modified at 110° C. by adding 15 g of trimellitic anhydride to obtain a polyesterpolyol L.

In the resulting polyesterpolyol L, a proportion of an acid group (the proportion modified with an acid anhydride among the entire terminal hydroxyl groups) was 2.0% and a secondary or tertiary terminal hydroxyl group accounted for 40% of the entire terminal hydroxyl groups.

Preparation Example 13

Preparation of Base Resins 1 to 7

The terminal acid-modified polyesterpolyols B, C, E, H, J and L as well as the polyesterpolyol D obtained in the above preparation examples were respectively mixed with the following additives according to the formulations shown in Table 1 to prepare base resins 1 to 7.
Epoxysilane: γ-glycidoxypropyltriethoxysilane (KBE-403, manufactured by SHIN-ETSU CHEMICAL CO., LTD.)
Aminosilane: N-(2-aminoethyl)-γ-aminopropyltriethoxysilane (KBE-603, manufactured by SHIN-ETSU CHEMICAL CO., LTD.)
Phosphoric acid: phosphoric acid (manufactured by Wako Pure Chemical Industries, Ltd.)
Silicone oil: SH200 350cs (manufactured by Dow Corning Toray Silicone Co., Ltd.)

Silicone-based surface conditioner: BYK-333 (manufactured by BYK-Chemie GmbH)

Preparation Example 14

Preparation of Isocyanate Group-Terminated Urethane Prepolymer A 225.00 g of the polyesterpolyol F and 1129.12 g of xylylene diisocyanate were charged in a reactor and an urethanization reaction was performed under a nitrogen gas stream at 70 to 80° C. Then, the unreacted xylylene diisocyanate was removed by thin film distillation to obtain an isocyanate group-terminated urethane prepolymer A. This isocyanate group-terminated urethane prepolymer A was found to have an average functionality of 2, an amine equivalent (isocyanate equivalent) of 413 and a content of the unreacted xylylene diisocyanate of 0.6% by weight.

Preparation Example 15

Preparation of Curing Agent 1

100 g of a biuret (a content of unmodified xylylene diisocyanate: 2.5% by weight) of xylylene diisocyanate was uniformly mixed with 900 g of a trimer (a content of unmodified hexamethylene diisocyanate: 0.3% by weight) of hexamethylene diisocyanate in which a portion of isocyanate groups was reacted with isobutanol under a nitrogen gas stream at 80° C. to obtain a curing agent 1. This curing agent 1 was found to have an amine equivalent (isocyanate equivalent) of 210 and the content of the unreacted diisocyanate (low molecular weight polyisocyanate having a molecular weight 190 or less) of 0.5% by weight.

Preparation Example 16

Preparation of Curing Agent 2

500 g of a biuret (a content of unmodified xylylene diisocyanate: 2.5% by weight) of xylylene diisocyanate was uniformly mixed with 500 g of a trimer (a content of unmodified hexamethylene diisocyanate: 0.3% by weight) of hexamethylene diisocyanate in which a portion of isocyanate groups was reacted with isobutanol under a nitrogen gas stream at 80° C. to obtain to obtain a curing agent 2. This curing agent 2 was found to have an amine equivalent (isocyanate equivalent) of 210 and a content of the unreacted diisocyanate (low molecular weight polyisocyanate having a molecular weight 190 or less) of 1.4% by weight.

Preparation Example 17

Preparation of Curing Agent 3

300 g of an isocyanate group-terminated urethane prepolymer A was uniformly mixed with 700 g of a trimer (a content of unmodified hexamethylene diisocyanate: 0.3% by weight) of hexamethylene diisocyanate in which a portion of isocyanate groups was reacted with isobutanol under a nitrogen gas stream at 80° C. to obtain a curing agent 3. The curing agent 3 was found to have an amine equivalent of 245 and a content of the unreacted diisocyanate (low molecular weight polyisocyanate having a molecular weight of 190 or less) of 0.4% by weight.

Preparation Example 18

Preparation of Curing Agent 4

1021.39 g of the polyesterpolyol G, 474.23 g of xylylene diisocyanate and 468.72 g of an allophanate (a content of unmodified hexamethylene diisocyanate: 0.9% by weight) of hexamethylene diisocyanate in which a portion of isocyanate groups was reacted with isobutanol were charged in a reactor and an urethanization reaction was performed under a nitrogen gas stream at 70 to 80° C. to obtain an isocyanate group-terminated urethane prepolymer B. This isocyanate group-terminated urethane prepolymer B was found to haven an average functionality of 2, an amine equivalent (isocyanate equivalent) of 652 and a content of the unreacted diisocyanate of 2.0% by weight.

Then, 700 g of the isocyanate group-terminated urethane prepolymer B was mixed with 300 g of a trimer (a content of unmodified hexamethylene diisocyanate: 0.3% by weight) in which a portion of isocyanate groups was reacted with isobutanol at 70 to 80° C. to obtain a curing agent 4. This curing agent 4 was found to have an amine equivalent of 399 and a content of the unreacted diisocyanate (low molecular weight polyisocyanate having a molecular weight of 190 or less) of 1.5% by weight.

Preparation Example 19

Preparation of Curing Agent 5

1052.06 g of the polyesterpolyol I, 497.94 g of xylylene diisocyanate and 492.16 g of an allophanate (a content of unmodified hexamethylene diisocyanate: 0.9% by weight) of hexamethylene diisocyanate in which a portion of isocyanate groups was reacted with isobutanol were charged in a reactor and an urethanization reaction was performed under a nitrogen gas stream at 70 to 80° C. to obtain an isocyanate group-terminated urethane prepolymer C. This isocyanate group-terminated urethane prepolymer C was found to have an average functionality of 2, an amine equivalent (isocyanate equivalent) of 626 and a content of the unreacted diisocyanate of 2.4% by weight.

Then, 700 g of the isocyanate group-terminated urethane prepolymer C was mixed with 300 g of a trimer (a content of unmodified hexamethylene diisocyanate: 0.3% by weight) of hexamethylene diisocyanate in which a portion of isocyanate groups was reacted with isobutanol at 70 to 80° C. to obtain a curing agent 5. This curing agent 5 was found to have an amine equivalent of 395 and a content of the unreacted diisocyanate (low molecular weight polyisocyanate having a molecular weight of 190 or less) of 1.7% by weight.

Preparation Example 20

Preparation of Curing Agent 6

1111.14 g of the polyesterpolyol K, 533.51 g of xylylene diisocyanate and 527.31 g of an allophanate (a content of unmodified hexamethylene diisocyanate: 0.9% by weight) of hexamethylene diisocyanate in which a portion of isocyanate groups was reacted with isobutanol were charged in a reactor and an urethanization reaction was performed under a nitrogen gas stream at 70 to 80° C. to obtain a isocyanate group-terminated urethane prepolymer D. This isocyanate group-terminated urethane prepolymer D was found to have an average functionality of 2, an amine equivalent (isocyanate equivalent) of 629 and a content of the unreacted diisocyanate of 2.3% by weight.

Then, 700 g of the isocyanate group-terminated urethane prepolymer D was mixed with 300 g of a trimer (a content of unmodified hexamethylene diisocyanate: 0.3% by weight) of hexamethylene diisocyanate in which a portion of isocyanate groups was reacted with isobutanol at 70 to 80° C. to obtain a curing agent 6. This curing agent 6 was found to have an amine equivalent of 402 and the content of the unreacted diisocyanate (low molecular weight polyisocyanate having a molecular weight of 190 or less) of 1.7% by weight.

Preparation Example 21

Preparation of Polyesterpolyol M 2867 g of isophthalic acid, 3570 g of 1,3-butanediol and 1931 g of neopentyl glycol were charged in a reactor and an esterification reaction was performed under a nitrogen gas stream at 190 to 220° C. After a predetermined amount of water was distilled off, 1261 g of adipic acid, 1745 g of sebacic acid and 0.39 g of titanium tetrabutoxide were added and an esterification reaction was performed under a nitrogen gas stream at 180 to 220° C. to obtain a polyesterpolyol M.

Preparation Example 22

Preparation of Terminal Acid-Modified Polyesterpolyol N 1000 g of the polyesterpolyol M was acid-modified at 110° C. by adding 25 g of trimellitic anhydride to obtain a polyesterpolyol N.

In the resulting polyesterpolyol N, a proportion of an acid group (the proportion modified with an acid anhydride among the entire terminal hydroxyl groups) was 3.2% and a secondary or tertiary terminal hydroxyl group accounted for 38.8% of the entire terminal hydroxyl groups.

Preparation Example 23

Preparation of Terminal Acid-Modified Polyesterpolyol O 1000 g of the polyesterpolyol M was acid-modified at 110° C. by adding 30 g of trimellitic anhydride to obtain a polyesterpolyol O.

In the resulting polyesterpolyol 0, a proportion of an acid group (the proportion modified with an acid anhydride among the entire terminal hydroxyl groups) was 3.9% and a secondary or tertiary terminal hydroxyl group accounted for 38.1% of the entire terminal hydroxyl groups.

Preparation Example 24

Preparation of Terminal Acid-Modified Polyesterpolyol P 1000 g of the polyesterpolyol M was uniformly mixed with 50 g of 1,3-butanediol at 110° C. and the mixture was acid-modified at 110° C. by adding 31.5 g of trimellitic anhydride to obtain a polyesterpolyol P.

In the resulting polyesterpolyol P, a proportion of an acid group (the proportion modified with an acid anhydride among the entire terminal hydroxyl groups) was 3.2% and a secondary or tertiary terminal hydroxyl group accounted for 38.8% of the entire terminal hydroxyl groups.

Preparation Example 25

Preparation of Terminal Acid-Modified Polyesterpolyol Q 1000 g of the polyesterpolyol M was uniformly mixed with 100 g of 1,3-butanediol at 110° C. and the mixture was acid-modified at 110° C. by adding 33 g of trimellitic anhydride to obtain a polyesterpolyol Q.

In the resulting polyesterpolyol Q, a proportion of an acid group (the proportion modified with an acid anhydride among the entire terminal hydroxyl groups) was 2.7% and a secondary or tertiary terminal hydroxyl group accounted for 39.3% of the entire terminal hydroxyl groups.

Preparation Example 26

Preparation of Terminal Acid-Modified Polyesterpolyol R 276 g of ethylene glycol and 456 g of neopentyl glycol were charged in a reactor and then dissolved by heating to 80° C. under a nitrogen gas stream. Subsequently, 245 g of adipic acid, 555 g of isophthalic acid and 338 g of sebacic acid were charged in the reactor and an esterification reaction was performed at 180 to 220° C. When an acid value reached 4, the reactor was evacuated and the reaction was performed under 133 Pa or less at 200° C. for one hour to obtain a polyesterpolyol having an acid value of 0.7 and a hydroxyl value of 122.

1000 g of the polyesterpolyol was acid-modified at 200° C. by adding 10 g of trimellitic anhydride to obtain a polyesterpolyol R. In the resulting polyesterpolyol R, a proportion of an acid group (the proportion modified with an acid anhydride among the entire terminal hydroxyl groups) was 2.6% and a secondary or tertiary terminal hydroxyl group accounted for 0% of the entire terminal hydroxyl groups.

Preparation Example 27

Preparation of Base Resins 8 to 11

The terminal acid-modified polyesterpolyols N to Q obtained in the above preparation examples were respectively mixed with the following additives according to the formulations shown in Table 2 to prepare base resins 8 to 11. The polyesterpolyol R was used as a base resin 12 without adding the additive.

Epoxysilane: γ-glycidoxypropyltriethoxysilane (KBE-403, manufactured by SHIN-ETSU CHEMICAL CO., LTD.)
Aminosilane: γ-aminopropyltriethoxysilane (KBE-903, manufactured by SHIN-ETSU CHEMICAL CO., LTD.)
Phosphoric acid: phosphoric acid (manufactured by Wako Pure Chemical Industries, Ltd.)

Preparation Example 28

Preparation of Isocyanate Group-Terminated Urethane Prepolymer E 645.94 g of the polyesterpolyol M and 2461.47 g of xylylene diisocyanate were charged in a reactor and an urethanization reaction was performed under a nitrogen gas stream at 70 to 80° C. Then, the unreacted xylylene diisocyanate was removed by thin film distillation to obtain an isocyanate group-terminated urethane prepolymer E. This isocyanate group-terminated urethane prepolymer E was found to have an average functionality of 2, an amine equivalent (isocyanate equivalent) of 454 and a content of the unreacted xylylene diisocyanate of 0.1% by weight.

Preparation Example 29

Preparation of Curing Agent 7

500 g of the isocyanate group-terminated urethane prepolymer E was uniformly mixed with 500 g of a trimer (a content of unmodified hexamethylene diisocyanate: 0.3% by weight) of hexamethylene diisocyanate in which a portion of isocyanate groups was reacted with isobutanol under a nitrogen gas stream at 70° C. to obtain a curing agent 7. This curing agent 7 was found to have an amine equivalent (isocyanate equivalent) of 288 and a content of an unreacted diisocyanate (low molecular weight polyisocyanate having a molecular weight of 190 or less) of 0.2% by weight.

Preparation Example 30

Preparation of Isocyanate Group-Terminated Urethane Prepolymer F 1432.14 g of the polyesterpolyol M and 2728.7 g of xylylene diisocyanate were charged in a reactor and an urethanization reaction was performed under a nitrogen gas stream at 70 to 80° C. Then, the unreacted xylylene diisocyanate was removed by thin film distillation to obtain an isocyanate group-terminated urethane prepolymer F. This isocyanate group-terminated urethane prepolymer F was found to have an average functionality of 2, an amine equivalent (isocyanate equivalent) of 494 and a content of the unreacted xylylene diisocyanate of 0.2% by weight.

Preparation Example 31

Preparation of Curing Agent 8

500 g of the isocyanate group-terminated urethane prepolymer F was uniformly mixed with 500 g of a trimer (a content of unmodified hexamethylene diisocyanate: 0.3% by weight) of hexamethylene diisocyanate in which a portion of isocyanate groups was reacted with isobutanol under a nitrogen gas stream at 70° C. to obtain a curing agent 8. This curing agent 8 was found to have an amine equivalent (isocyanate equivalent) of 298 and the content of the unreacted diisocyanate (low molecular weight polyisocyanate having a molecular weight of 190 or less) of 0.2% by weight.

Preparation Example 32

Preparation of Isocyanate Group-Terminated Urethane Prepolymer G 1432.14 g of the polyesterpolyol M and 2728.7 g of xylylene diisocyanate were charged in a reactor and an urethanization reaction was performed under a nitrogen gas stream at 70 to 80° C. Then, the unreacted xylylene diisocyanate was removed by thin film distillation to obtain an isocyanate group-terminated urethane prepolymer G. This isocyanate group-terminated urethane prepolymer G was found to have an average functionality of 2, an amine equivalent (isocyanate equivalent) of 422 and a content of the unreacted xylylene diisocyanate of 3.2% by weight.

Preparation Example 33

Preparation of Curing Agent 9

600 g of the isocyanate group-terminated urethane prepolymer G was uniformly mixed with 400 g of a trimer (a content of unmodified hexamethylene diisocyanate: 0.3% by weight) of hexamethylene diisocyanate in which a portion of isocyanate groups was reacted with isobutanol under a nitrogen gas stream at 70° C. to obtain a curing agent 9. This curing agent 9 was found to have an amine equivalent of 299 and a content of the unreacted diisocyanate (low molecular weight polyisocyanate having a molecular weight of 190 or less) of 2.0% by weight.

Preparation Example 34

Preparation of Curing Agent 10

600 g of the isocyanate group-terminated urethane prepolymer F was uniformly mixed with 400 g of a trimer (a content of unmodified hexamethylene diisocyanate: 0.3% by weight) of hexamethylene diisocyanate in which a portion of isocyanate groups was reacted with isobutanol under a nitrogen gas stream at 70° C. to obtain a curing agent 10. This curing agent 10 was found to have an amine equivalent (isocyanate equivalent) of 318 and a content of the unreacted diisocyanate (low molecular weight polyisocyanate having a molecular weight of 190 or less) of 0.2% by weight.

Preparation of Examples and Comparative Examples

The base resins 1 to 7 and the curing agents 1 to 6 obtained in the above preparation examples were respectively mixed according to the formulations shown in Table 3 to prepare two-component curable solventless adhesives of Examples 1 to 4 and Comparative Examples 1 to 3.

The base resins 8 to 12 and the curing agents 7 to 10 obtained in the above preparation examples, and the curing agent 11 (CORONATE HX (manufactured by Nippon Polyurethane Industry Co., Ltd., solid content: 100% by weight, amine equivalent: 199) was used as it was) were respectively mixed according to the formulations shown in Table 4 to prepare two-component curable solventless adhesives of Examples 5 to 10 and Comparative Example 4.

Using these two-component curable solventless adhesives, laminated composite films were produced. These laminated composite films were subjected to a hot water resistance test and a content resistance test, and then physical properties were evaluated. The results are shown in Table 5 and Table 6.

With respect to the respective examples and comparative examples shown in Table 5, viscosities after uniform mixing at 70° C. for 2 minutes and viscosities after uniform mixing at 70° C. for 40 minutes were measured. The results are also shown in Table 5.

With respect to the respective examples and comparative examples shown in Table 6, viscosities after uniform mixing at 50° C. for 2 minutes and viscosities after uniform mixing at 50° C. for 40 minutes were measured. The results are also shown in Table 6.

Production of Laminated Composite Films

A laminated composite film comprising a polyethylene terephthalate film (thickness: 12 μm) and an aluminum foil (thickness: 9 μm) was previously produced using a solvent-based adhesive (prepared by mixing 10 parts by weight of TAKELAC A-310 (manufactured by MITSUI TAKEDA CHEMICALS, INC.) with 1 part by weight of TAKENATE A-3 (manufactured by MITSUI TAKEDA CHEMICALS, INC.) and diluting the mixture with ethyl acetate). On the side of the aluminum foil of this laminated composite film, each of the two-component curable solventless adhesives of the respective examples and comparative examples was coated (coating weight: 2.8 to 3.0 g/m²) using a solventless laminator (TNS-400-200, manufactured by OKAZAKI MACHINE INDUSTRY CO., LTD.). Then, an undrawn polypropylene film (thickness: 70 μm) was laminated on the coated surface to produce a three-layered laminated composite film. This three-layered laminated composite film was aged under the conditions of a temperature of 50° C. for 3 days, thereby to cure the two-component curable solventless adhesive.

Hot Water Resistance Test and Content Resistance Test

Using each of the laminated composite films thus produced, a bag measuring 13×17.5 cm was produced and then filled with a mixture prepared previously mixing vinegar, salad oil and ketchup in a mixing volume ratio of 1:1:1. This bag was placed on a tray measuring 210×520×10⁵ mm and subjected to hot water sterilization at 135° C. for 20 minutes under pressure of 0.20 MPa. After removing the contents, the strength of adhesion between the aluminum foil and the undrawn polypropylene film was evaluated at room temperature by a T-peel test under the conditions of a sample width of 15 mm and a testing speed of 300 mm/min.

The bag thus subjected to the hot water treatment was stored in a thermostat at 40° C. (Table 5) or 50° C. (Table 6) for 2 weeks and the appearance of the bag was visually observed, the presence or absence of pear skin was confirmed and the strength of adhesion between the aluminum foil and the undrawn polypropylene film was measured in the same manner.

TABLE 3

| Examples and Comparative Examples | Base resin Kind | Base resin Parts | Curing agent Kind | Curing agent Parts | (Parts by weight) Acid equivalent/amine equivalent** |
|---|---|---|---|---|---|
| Example 1 | Base resin 1 | 100 | Curing agent 3 | 55 | 23 |
| Example 2 | Base resin 2 | 65 | Curing agent 4 | 100 | 41 |
| Example 3 | Base resin 3 | 45 | Curing agent 5 | 100 | 59 |
| Example 4 | Base resin 4 | 45 | Curing agent 6 | 100 | 30 |
| Comparative Example 1 | Base resin 5 | 100 | Curing agent 2 | 60 | 134 |
| Comparative Example 2 | Base resin 6 | 100 | Curing agent 1 | 55 | 86 |
| Comparative Example 3 | Base resin 7 | 100 | Curing agent 1 | 46 | 21 |

**Acid equivalent/amine equivalent represents the value of the formula (1).

TABLE 1

(Parts by weight)

| Polyesterpolyol | Base resin 1 | Base resin 2 | Base resin 3 | Base resin 4 | Base resin 5 | Base resin 6 | Base resin 7 |
|---|---|---|---|---|---|---|---|
| B | | | | | | 100 | |
| C | 100 | | | | | | |
| D | | | | 100 | | | |
| E | | | | | | | 100 |
| H | | 100 | | | | | |
| J | | | 100 | | | | |
| L | | | | | 100 | | |
| Epoxysilane | 2 | 2 | 2 | 2 | 2 | 2 | 2 |
| Aminosilane | — | 0.2 | 0.2 | 0.2 | 0.5 | — | — |
| Phosphoric acid | 0.1 | 0.1 | 0.1 | 0.1 | 0.08 | 0.1 | 0.1 |
| Silicone oil | — | — | — | — | — | — | 0.05 |
| Silicone-based surface conditioner | — | — | — | — | — | — | 0.15 |
| Hydroxyl group equivalent | 512 | 263 | 270 | 258 | 290 | 409 | 439 |
| Acid equivalent | 10200 | 10727 | 10408 | 5343 | 46750 | 33000 | 9350 |

TABLE 2

| Polyesterpolyol | Base resin 8 | Base resin 9 | Base resin 10 | Base resin 11 | Base resin 12 |
|---|---|---|---|---|---|
| N | 100 | | | | |
| O | | 100 | | | |
| P | | | 100 | | |
| Q | | | | 100 | |
| R | | | | | 100 |
| Epoxysilane | 2 | 2 | 2 | 2 | — |
| Aminosilane | 0.2 | 0.2 | 0.2 | 0.2 | — |
| Phosphoric acid | 0.1 | 0.1 | 0.1 | 0.1 | — |
| Hydroxyl group equivalent | 276 | 274 | 220 | 189 | 501 |
| Acid equivalent | 3206 | 2953 | 2930 | 3039 | 14025 |

TABLE 4

| Examples and Comparative Examples | Base resin Kind | Base resin Parts | Curing agent Kind | Curing agent Parts | (Parts by weight) Acid equivalent/amine equivalent** |
|---|---|---|---|---|---|
| Example 5 | Base resin 8 | 60 | Curing agent 7 | 100 | 19 |
| Example 6 | Base resin 9 | 65 | Curing agent 7 | 100 | 16 |
| Example 7 | Base resin 9 | 80 | Curing agent 8 | 100 | 11 |
| Example 8 | Base resin 10 | 50 | Curing agent 9 | 100 | 18 |
| Example 9 | Base resin 11 | 50 | Curing agent 10 | 100 | 19 |

TABLE 4-continued

| Examples and Comparative Examples | Base resin Kind | Parts | Curing agent Kind | Parts | (Parts by weight) Acid equivalent/amine equivalent** |
|---|---|---|---|---|---|
| Example 10 | Base resin 11 | 40 | Curing agent 10 | 100 | 24 |
| Comparative Example 4 | Base resin 12 | 100 | Curing agent 11 | 50 | 24 |

**Acid equivalent/amine equivalent represents the value of the formula (1).

TABLE 5

| Examples and Comparative Examples | Viscosity after uniform mixing at 70° C. for 2 minutes (mPa · s) | Viscosity after uniform mixing at 70° C. for 40 minutes (mPa · s) | T-peel strength after hot water sterilization (N) | Appearance after storage at 40° C. for 2 weeks | T-peel strength after storage at 40° C. for 2 weeks (N) |
|---|---|---|---|---|---|
| Example 1 | 550 | 9640 | 10.5 | No pear skin | 10.1 |
| Example 2 | 1260 | 8190 | 7.4 | No pear skin | 7.8 |
| Example 3 | 1350 | 4680 | 10.1 | No pear skin | 8.8 |
| Example 4 | 1400 | 12740 | 9.9 | No pear skin | 10.2 |
| Comparative Example 1 | 880 | 3250 | 6.8 | Pear skin | 0.4 |
| Comparative Example 2 | 520 | 3110 | 5.2 | No pear skin | 1.8 |
| Comparative Example 3 | 640 | 26900 | 4.3 | No pear skin | 4.1 |

TABLE 6

| Examples and Comparative Examples | Viscosity after uniform mixing at 50° C. for 2 minutes (mPa · s) | Viscosity after uniform mixing at 50° C. for 40 minutes (mPa · s) | T-peel strength after hot water sterilization (N) | Appearance after storage at 50° C. for 2 weeks | T-peel strength after storage at 50° C. for 2 weeks (N) |
|---|---|---|---|---|---|
| Example 5 | 1120 | 5610 | 5.7 | No pear skin | 10.2 |
| Example 6 | 1020 | 7170 | 4.7 | No pear skin | 9.3 |
| Example 7 | 1260 | 11440 | 6.2 | No pear skin | 7.0 |
| Example 8 | 1100 | 6400 | 8.0 | No pear skin | 8.0 |
| Example 9 | 1390 | 10200 | 3.7 | No pear skin | 5.0 |
| Example 10 | 1010 | 8850 | 10.9 | No pear skin | 10.8 |
| Comparative Example 4 | 4450 | 14380 | 4.0 | Pear skin | 3.5 |

While the illustrative embodiments and examples of the present invention are provided in the above description, such are for illustrative purpose only and it is not to be construed limitatively. Modification and variation of the present invention which will be obvious to those skilled in the art are to be covered in the following claims.

INDUSTRIAL APPLICABILITY

The two-component curable solventless adhesive enables a laminated composite film comprising a barrier layer and a plastic film laminated with each other to maintain excellent appearance and adhesive strength for a long period even after a sterilization treatment at high temperature, and to appropriately adjust a reaction between a base resin and a curing agent during a production of the laminated composite film, thereby to ensure excellent workability. Therefore, the two-component curable solventless adhesive of the present invention can be preferably used to produce laminated composite films as packaging materials in various industrial fields of foods, beverages, drugs and quasi drugs.

The invention claimed is:

1. A two-component curable solventless adhesive consisting of a base resin and a curing agent, wherein
the base resin contains a polyol having an acid group, a secondary or tertiary terminal hydroxyl group accounts for 30% or more of the entire terminal hydroxyl groups of the polyol, and 0.3 mol % or more and below 20 mol % of the entire terminal hydroxyl groups of the polyol is modified with a trimellitic anhydride, and
the curing agent contains an isocyanate group-terminated urethane prepolymer obtained by reaction of a raw polyisocyanate containing at least an aralkyl polyisocyanate and/or a modified substance thereof with a macropolyol having a number average molecular weight of 400 to 5000, and a content of a low molecular weight polyisocyanate having a molecular weight of 190 or less is 3% by weight or less, and
a value calculated from the following formula (1) is 10 or more and 30 or less:

$$\frac{(\text{Acid equivalent of base resin}) \times (\text{Amount of curing agent (parts by weight)})}{(\text{Isocyanate equivalent of curing agent}) \times (\text{Amount of base resin (parts by weight)})} \quad (1)$$

2. The two-component curable solventless adhesive according to claim 1, wherein an average functionality of the isocyanate group-terminated urethane prepolymer is from 1.5 to 2.5.

3. The two-component curable solventless adhesive according to claim 1, wherein the curing agent contains an aliphatic polyisocyanate and/or a modified substance thereof, and
a content of the isocyanate group-terminated urethane prepolymer is from 1 to 80% by weight and a content of the aliphatic polyisocyanate and/or the modified substance thereof is from 20 to 99% by weight, based on a total amount of the isocyanate group-terminated urethane prepolymer and the aliphatic polyisocyanate and/or the modified substance thereof in the curing agent.

4. The two-component curable solventless adhesive according to claim 1 used to laminate a barrier layer and a plastic film.

5. A two-component curable solventless adhesive comprising a base resin and a curing agent, wherein
the base resin contains a polyol having an acid group, and a secondary or tertiary terminal hydroxyl group accounts for 30% or more of the entire terminal hydroxyl groups of a molecular of the polyol, and 0.3 mol % or more and below 20 mol % of the entire terminal hydroxyl groups of the molecular of the polyol is modified with a trimellitic anhydride, and
the curing agent contains an isocyanate group-terminated urethane prepolymer obtained by reaction of a raw polyisocyanate containing at least an aralkyl polyisocyanate and/or a modified substance thereof with a macropolyol having a number average molecular weight of 400 to 5000, and a value calculated from the following formula (1) is 10 or more and 30 or less:

$$\frac{(\text{Acid equivalent of base resin}) \times (\text{Amount of curing agent (parts by weight)})}{(\text{Isocyanate equivalent of curing agent}) \times (\text{Amount of base resin (parts by weight)})} \quad (1)$$

* * * * *